United States Patent
Schönenbach et al.

(10) Patent No.: US 6,818,279 B2
(45) Date of Patent: Nov. 16, 2004

(54) FOLDABLE CONVERTIBLE TOP AND METHOD OF MAKING SAME

(75) Inventors: Heinz Schönenbach, Remscheid (DE); Martin Windpassinger, Hauzenberg (DE); Manfred Kasparak, Neureichenau (DE)

(73) Assignee: Parat Automotive Schonenbach GmbH & Co. KG, Remscheid (DE)

( * ) Notice: Subject to any disclaimer, the term of this patent is extended or adjusted under 35 U.S.C. 154(b) by 0 days.

(21) Appl. No.: 10/226,085

(22) Filed: Aug. 22, 2002

(65) Prior Publication Data

US 2003/0052510 A1 Mar. 20, 2003

(30) Foreign Application Priority Data

Aug. 22, 2001 (DE) .......... 101 40 194
Jun. 26, 2002 (DE) .......... 102 28 613
Jul. 25, 2002 (EP) .......... 02016587

(51) Int. Cl.[7] .................. B60J 7/12
(52) U.S. Cl. ............ 428/156; 296/37.7; 296/98; 296/100.11; 296/107.07; 296/187.01; 296/225; 428/119; 428/120; 428/158; 428/160; 428/163; 428/213; 428/217
(58) Field of Search ............... 428/156, 158, 428/159, 160, 163, 119, 120, 213, 217; 296/187.01, 37.7, 225, 100.11, 107.07, 98, 107.1, 136.1, 211

(56) References Cited

U.S. PATENT DOCUMENTS

| | | | |
|---|---|---|---|
| 5,267,770 A | 12/1993 | Orth | |
| 5,807,514 A | * 9/1998 | Grinshpun et al. | ........ 264/46.6 |
| 6,183,037 B1 | 2/2001 | Bauer | |
| 6,302,471 B1 | * 10/2001 | Windpassinger et al. | ........ 296/107.11 |
| 6,340,196 B1 | 1/2002 | Windpassinger | |

FOREIGN PATENT DOCUMENTS

| | | |
|---|---|---|
| DE | 82 05 999 | 7/1982 |
| DE | 29922552 | 6/2001 |
| EP | 0873896 | 10/1998 |
| JP | 09109306 | 4/1997 |

* cited by examiner

*Primary Examiner*—Nasser Ahmad
(74) *Attorney, Agent, or Firm*—Herbert Dubno; Andrew Wilford

(57) ABSTRACT

A cover for a foldable convertible top has a highly stretchable outer foil having an inner face, and a foam-plastic core layer bonded over the entire bonding-foil inner face and itself having an inner face. The outer foil can be a one-piece slush-molded foil or it can be highly stretchable and a thin thermoplastic bonding foil can be provided between the outer foil and the core layer.

12 Claims, 4 Drawing Sheets

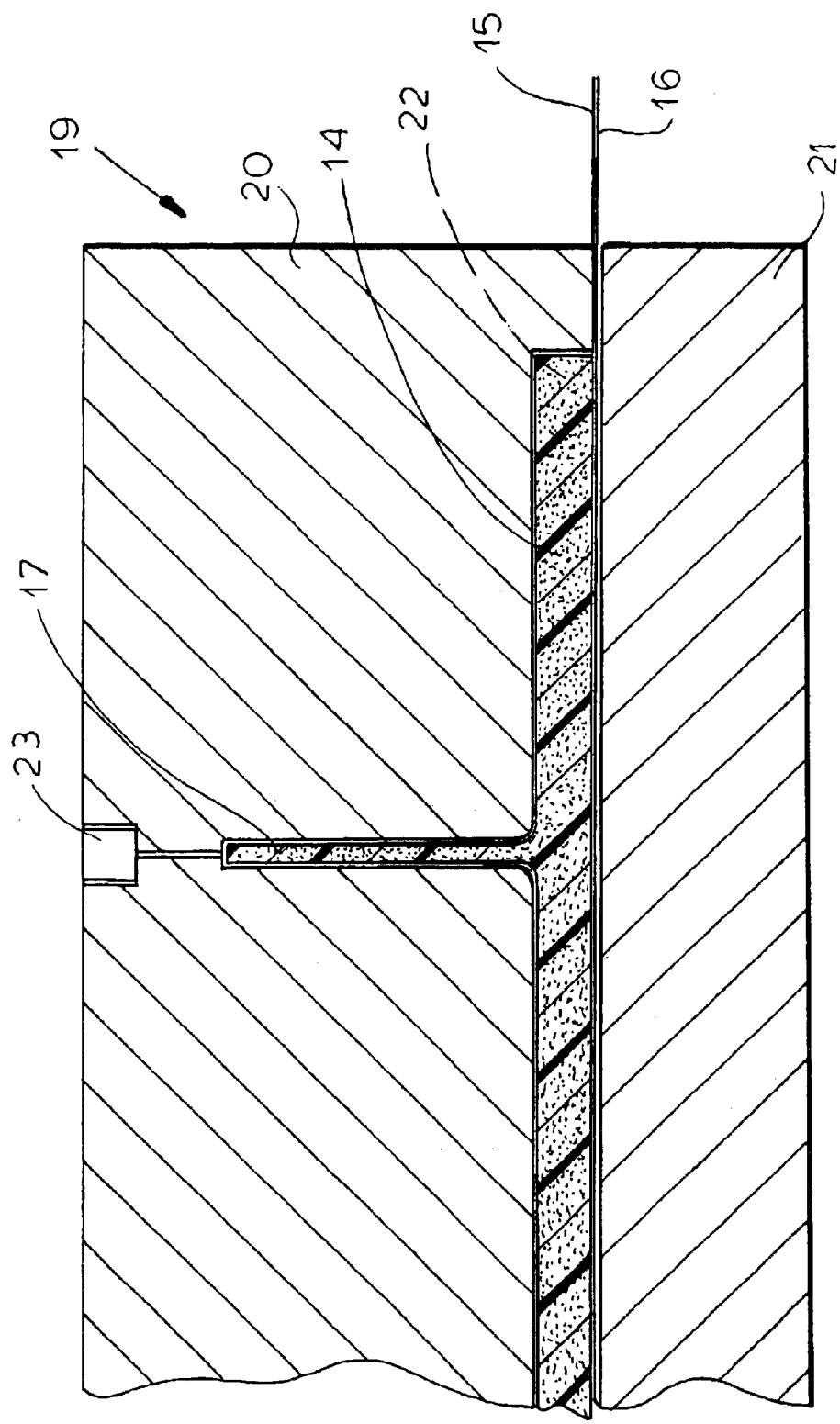

FOLDABLE CONVERTIBLE TOP AND METHOD OF MAKING SAME

FIELD OF THE INVENTION

The present invention relates to foldable convertible top. More particularly this invention concerns a method of making such a top.

BACKGROUND OF THE INVENTION

U.S. Pat. No. 5,267,770 of Orth describes a folding convertible top having a cover with a pair of full-length front-to-back seams that join a center panel to a pair of side panels. This cover is made of a flexible waterproof textile and is stretched over a rack having a plurality of transverse ribs. As the rack is folded up to lower the top, the cover is therefore folded transversely of the seams which buckle and are crushed together as the cover is fitted into the rear storage compartment. As a result the cover is severely stressed along these seams so that cracks eventually develop, leading to leaks and an unattractive appearance.

The cover described in German utility model 82 05 999 is basically made of two panels joined along a transversely extending seam. It can fold along a line on or parallel to this seam to reduce stress. Such a top is however somewhat complex to manufacture since it has several parts, and can leak at the seam.

In U.S. Pat. No. 6,183,037 of Bauer the convertible top is molded of a single smooth piece. Such a top is very attractive, but is made by an extremely complex process so that it is very costly.

OBJECTS OF THE INVENTION

It is therefore an object of the present invention to provide an improved foldable convertible top.

Another object is the provision of such an improved foldable convertible top which overcomes the above-given disadvantages, that is which is of inexpensive construction yet which is quite attractive.

A further object is to provide an improved method of making a foldable convertible top.

SUMMARY OF THE INVENTION

A cover for a foldable convertible top has according to the invention an outer foil having an inner face, and a foam-plastic core layer bonded over the entire bonding-foil inner face and itself having an inner face. The outer foil can be a one-piece slush-molded foil or it can be a highly stretchable and a thin thermoplastic bonding foil can be provided between the outer foil and the core layer. The core layer can be formed as described in commonly owned U.S. Pat. No. 6,340,196.

When not slush molded, the outer foil has 300% to 400% stretchability so that it can conform perfectly to the complex three-dimensional shape that the convertible top must have. It is a polyacrylate about 20 µm thick. The bonding layer is of thermoplastic polyurethane.

According to the invention an inner polyurethane foil is bonded over the entire core-layer inner face. This provides it with a nonabsorbent inner surface that is easy to maintain clean and can easily be tinted to the desired decor color.

When the outer foil is slush-molded it normally 1 mm to 2 mm thick. The slush-molded outer layer has a roughened inner surface and is a two-component polyurethane.

Normally according to the invention the core layer has a Shore D hardness of about 40 and is formed with at least one inwardly open groove so that the cover can fold readily along the groove. The core layer is 7 mm to 8 mm thick but is only about 2 mm thick at the groove.

The core layer can further be unitarily formed in accordance with the invention with at least one inwardly projecting rib and the outer foil is stretched and tightly bonded over the rib. The rib is formed wholly by the core layer and outer foil or, if desired, a reinforcement strip is imbedded in the rib.

The convertible-top cover according to the invention is made according to the invention by first laying in a mold cavity of a first mold part a highly stretchable outer foil and then sucking the foil into tight engagement with an inner surface of the cavity. Then a second mold part is fitted over the first mold part to close the cavity and an expandable polyurethane foam is introduced into the cavity so that the foam fills the cavity and presses the foils together against the first mold part. The foam is cured in the cavity. Then the cured workpiece is demolded and trimmed to size.

It is also possible to fit an inner foil to the second mold part so that the foam is introduced between the inner and bonding foils. This provides an easy-to-clean lining for the convertible top.

In addition a thin thermoplastic bonding layer can be applied over the outer foil in the first mold part before the resin is injected in and the mold is closed. Alternately the outer foil is slush-molded, either right in the second mold part or in a separate mold. It has the exact complex three-dimensional finished shape of the outer surface of the convertible top.

The convertible-top cover according to the invention has no seams at all. Instead it is a single unitary construction that can be certain not to leak and to have a nice aerodynamic appearance. It can be made inexpensively since there is no complex stitching and fitting operation, being ready to use after demolding and trimming. The polyurethane core layer is a very good sound and heat insulator and can be molded to any desired shape since it has no seams.

When the outer layer is slush molded of Elastolan® (Elastogran GmbH) or of a thermoplastic polyurethane from the Recticel firm. The outer foil can be a polyurethane foil (e.g. Walopur® or Platilon® of Epurex Films GmbH) about 20 µm to 70 µm thick. Such an outer layer is completely water impervious so that it will ensure that the convertible top is water tight.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 6 and 7 are partly diagrammatic sectional views illustrating manufacture of the structure shown in FIG. 4.

SPECIFIC DESCRIPTION

Figure 1:
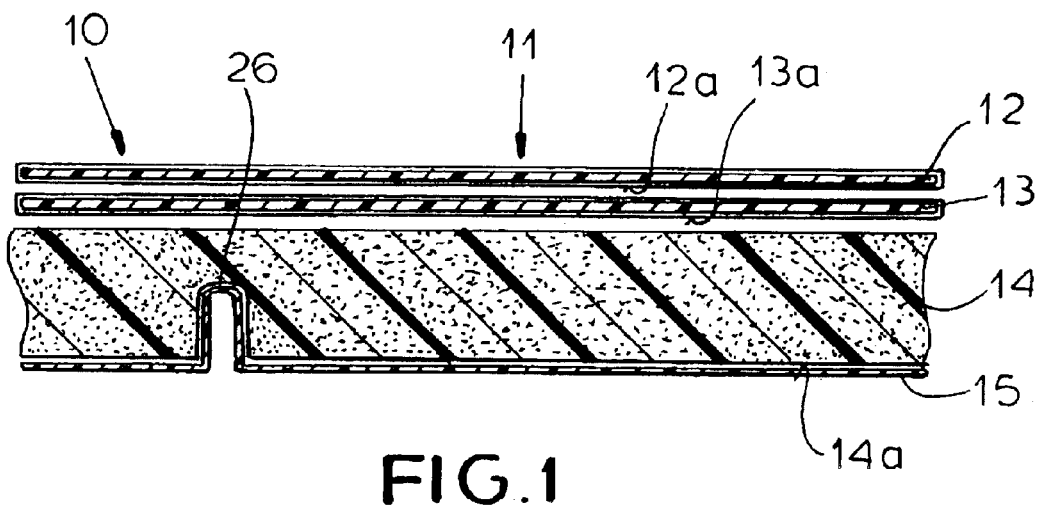

As seen in FIG. 1 a convertible-top cover 10 according to the invention has an outer skin or layer 11 intended to be exposed to the elements on the outside of a vehicle and formed of two layers 12 and 13. The layer 12 is a polyacrylate able to withstand 300% to 400% stretching without damage and having an inner surface 12a to which is bonded the layer 13 which is thin, here 20 μm, thick and made of a thermoplastic polyurethane (TPU). In turn, an inner face 13a of this bonding layer 13 is bonded over its entire surface to a thicker foam layer 14. The bonding layer 13 not only allows the layer 14 to be fixed to the layer 11, but prevents the layer 14 from penetrating into the layer 11.

This foam layer 14 can itself form the innermost layer of the top 10 or can have an inner surface 14a bonded to an additional thin polyurethane (PU) layer 15 that is laid in the mold used to form the layer 14 and that eliminates the need for a mold-release agent. The layer 14 is continuous and water-impervious so that it prevents any liquid from soaking into the foam layer 14 in the finished installation, presenting a smooth easy-to-clean roof lining.

FIG. 1 also shows how the cover 10 is formed with at least one inwardly open groove 26 where the normal thickness of 7 mm to 8 mm of the layer 14 is reduced to about 2 mm. This groove 26 forms a location at which the cover 10 will naturally fold, so that the provision of an array of such grooves can assure that, when the cover 10 is stowed, it will fold neatly along predetermined lines.

Figure 2:
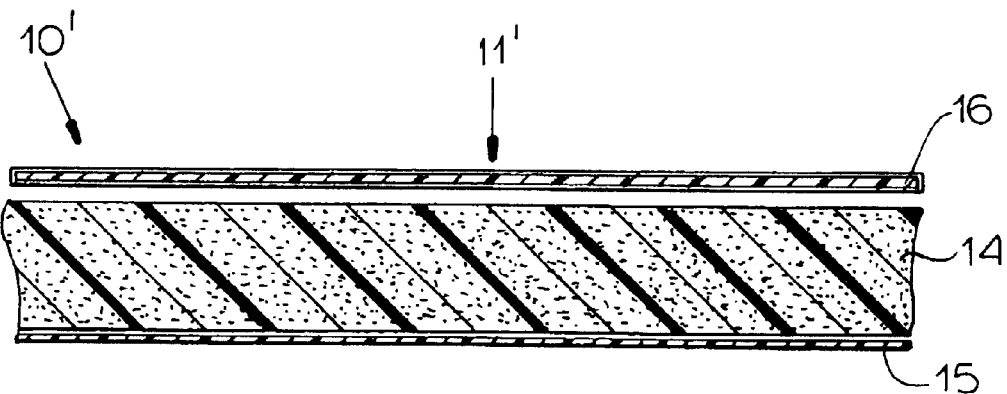
FIGS. 1, 2, and 3 are cross sections through covers according to the invention, the layers being shown spaced for clarity of view.

In FIG. 2 the cover 10' has an outer skin 11' formed by a slush layer 16, that is a layer like the foil 12 but formed by slush molding so as to have a smooth or grained outer surface and a rough inner surface bonded to the TPU layer 14. The slush-molded layer 16 is between 0.5 mm and 3 mm thick, preferably between 1 mm and 2 mm. Here an inner bonding layer 13 is optional.

Figure 3:
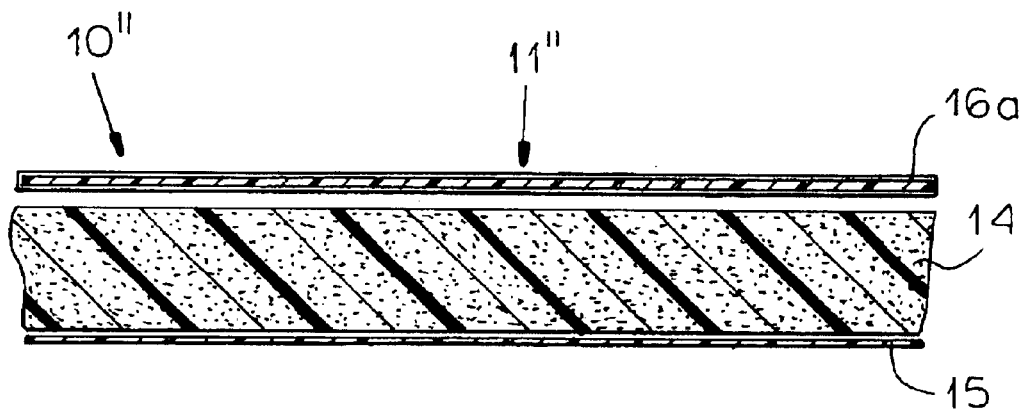

In FIG. 3 the layer 16a is not slush molded in the same mold used to create the cover 10", but instead is made elsewhere, being subsequently dropped into the mold bonding the outer layer 11" to the foam layer 14.

Figure 4:
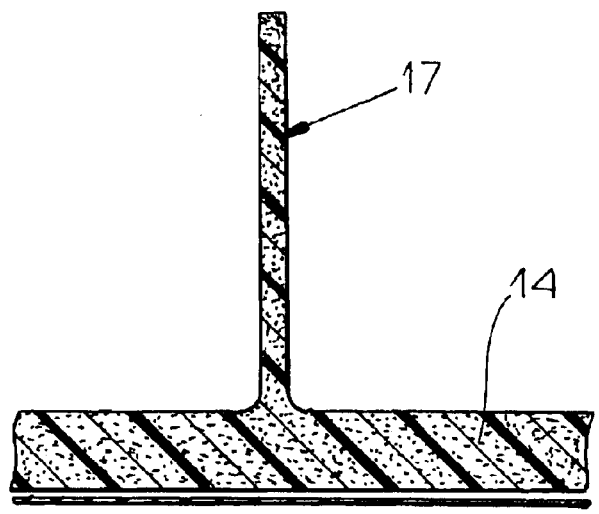
FIGS. 4 and 5 are sections through ribbed portions of covers in accordance with the invention.
Figure 5:
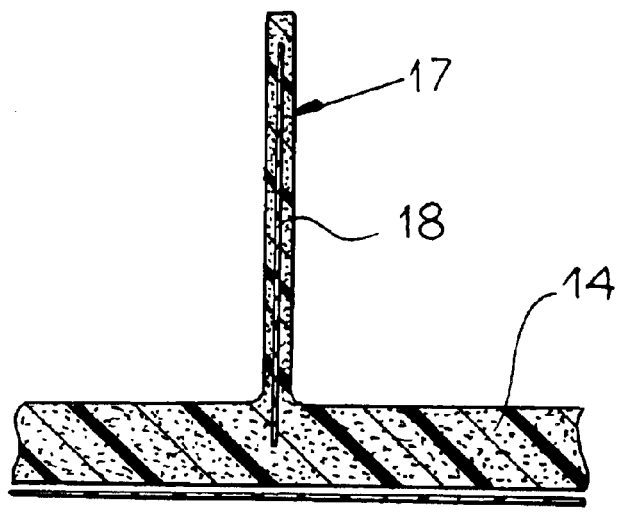

FIGS. 4 and 5 show how the foam PU layer 14 can be unitarily formed with ribs 17 used for stiffening and reinforcement. In FIG. 5 the rib 17 is provided internally with a textile-tape reinforcement 18.

Figure 6:
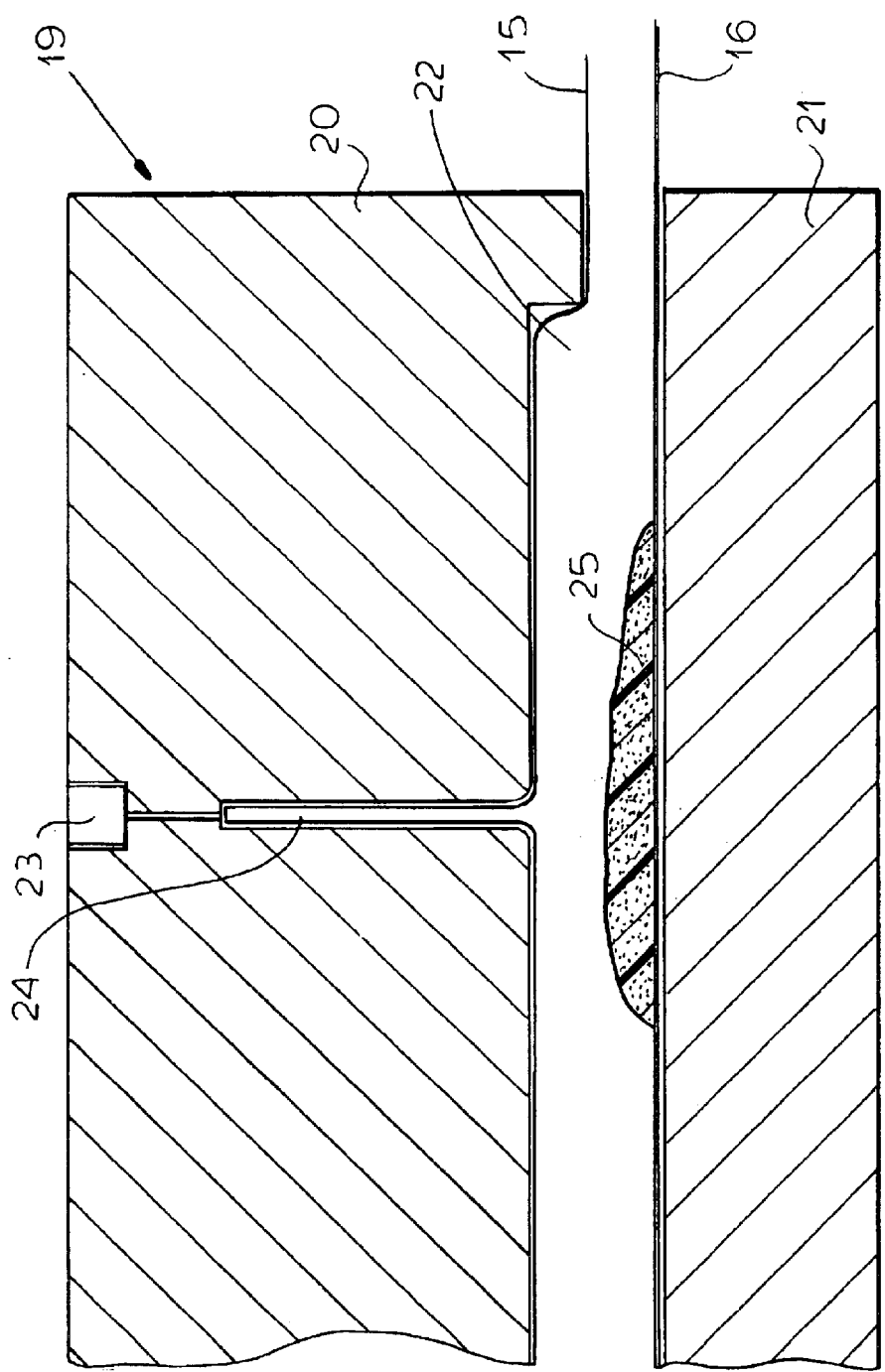

FIGS. 6 and 7 show a mold 19 having a female upper part 20 and a flat lower part 21 that together form a mold cavity 22 from which air can be sucked via an outlet 23 opening into the base of a long groove 24 opening downward into the cavity 22. To start with the PU lining layer 15 is fitted to the mold part 20 and air exhausted through the port 23 serves to suck it into tight engagement with the inner surface of this part 20, even up into the groove 24. The inner layer 16 is similarly laid on the flat upper surface of the mold part 21 and, if desired, can be sucked down into place by withdrawing air through this part 21 like the part 20.

Thereafter a mass 25 of foamable two-part polyurethane is deposited on the foil 16 on the mold part 21 and the mold is closed as shown in FIG. 7. The foil 16 can be slush molded in the same or another mold or can simply be a highly stretchable sheet laid in the mold part 21. The resin foams up and fills the entire cavity 22, further pressing the foils 15 and 16 into contact with the surfaces of the respective mold parts 20 and 21. The result is an integral cover 10 having the exact shape as the cavity 22, with the layer 15 on its inner side stretched over the ribs 17 and the layer 16 on its outside.

Of course once the resin mass 25 has expanded and cured in the cavity 22, the mold parts 20 and 21 are separated to demold the finished piece. It is then trimmed to size so as to have the exact complex three-dimensional shape of a convertible top in the up position, nonetheless being able to fold up for stowing when down.

We claim:

1. A cover for a foldable convertible top, the cover comprising:

an outer polyacrylate foil having an inner face and 300% to 400% stretchability;

a foam-plastic core layer bonded over the entire outer-foil inner face, having a Shore D hardness of about 40, and itself having an inner face;

a thin thermoplastic bonding foil bonded over the entire outer-foil inner face and itself having an inner face; and an inner highly stretchable polyurethane foil bonded over the entire core-layer inner face.

2. The convertible-top cover defined in claim 1 wherein the bonding foil is about 20 μm thick.

3. The convertible-top cover defined in claim 1 wherein the bonding foil is of thermoplastic polyurethane.

4. The convertible-top cover defined in claim 1 wherein the outer foil is slush-molded.

5. The convertible-top cover defined in claim 1 wherein the outer foil is 1 mm to 2 mm thick.

6. The convertible-top cover defined in claim 4 wherein the slush-molded outer layer has a roughened inner surface.

7. The convertible-top cover defined in claim 1 wherein the core layer is a two-component polyurethane.

8. The convertible-top cover defined in claim 1 wherein the core layer is formed with at least one inwardly open groove, whereby the cover can fold readily along the groove.

9. The convertible-top cover defined in claim 8 wherein the core layer is 7 mm to 8 mm thick but is only about 2 mm thick at the groove.

10. The convertible-top cover defined in claim 1 wherein the core layer is unitarily formed with at least one inwardly projecting rib and the cuter foil is stretched and tightly bonded over the rib.

11. The convertible-top cover defined in claim 10 wherein the rib is formed wholly by the core layer and outer foil.

12. The convertible-top cover defined in claim 10, further comprising a reinforcement strip imbedded in the rib.

\* \* \* \* \*